United States Patent
Wilkerson, Jr. et al.

(10) Patent No.: US 12,455,727 B2
(45) Date of Patent: Oct. 28, 2025

(54) SYSTEM AND METHOD FOR A HETEROGENOUS SOFTWARE PLATFORM

(71) Applicant: RDW Advisors, LLC., Alexandria, VA (US)

(72) Inventors: Reginald D. Wilkerson, Jr., Alexandria, VA (US); Mathew R. Citarella, Charlotte, VT (US)

(73) Assignee: RDW ADVISORS, LLC., Alexandria, VA (US)

( * ) Notice: Subject to any disclaimer, the term of this patent is extended or adjusted under 35 U.S.C. 154(b) by 0 days.

(21) Appl. No.: 18/414,889

(22) Filed: Jan. 17, 2024

(65) Prior Publication Data

US 2024/0152336 A1 May 9, 2024

Related U.S. Application Data

(63) Continuation of application No. 17/662,951, filed on May 11, 2022, now Pat. No. 11,907,688.

(51) Int. Cl.
| | |
|---|---|
| *G06F 8/36* | (2018.01) |
| *G06F 8/30* | (2018.01) |
| *G06F 9/54* | (2006.01) |

(52) U.S. Cl.
CPC .............. *G06F 8/36* (2013.01); *G06F 8/31* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 6,298,476 | B1* | 10/2001 | Misheski | G06F 8/71 |
| | | | | 717/121 |
| 9,582,673 | B2* | 2/2017 | Wahl | G06F 21/604 |
| 11,907,688 | B2* | 2/2024 | Wilkerson, Jr. | G06F 8/31 |
| 2004/0148592 | A1* | 7/2004 | Vion-Dury | G06F 8/437 |
| | | | | 717/114 |
| 2006/0195476 | A1* | 8/2006 | Nori | G06F 16/258 |
| 2010/0114642 | A1* | 5/2010 | Dufosse | G06Q 10/06311 |
| | | | | 715/723 |
| 2012/0030220 | A1* | 2/2012 | Edwards | G06F 16/25 |
| | | | | 707/754 |

(Continued)

OTHER PUBLICATIONS

Luckow, "Methods and Experiences for Developing Abstractions for Data-intensive, Scientific Applications", 2020, IEEE (Year: 2020).*

(Continued)

*Primary Examiner* — Hossain M Morshed
(74) *Attorney, Agent, or Firm* — Venable LLP; Ryan T. Ward

(57) ABSTRACT

Systems, methods, and computer-readable storage media for a framework for a heterogenous set of software services to operate in a uniform manner A system can store data types representing computational abstractions, where the computer has at least one processor and a plurality of heterogenous data storage engines. The system can build, using the plurality of data types, the computational abstractions, the computational abstractions comprising: operations, environment, an event bus, and a workflow management system. The system can then store and execute these computational abstractions as needed.

20 Claims, 11 Drawing Sheets

(56) References Cited

U.S. PATENT DOCUMENTS

| | | | | |
|---|---|---|---|---|
| 2014/0006480 A1* | 1/2014 | Dobrev | ................ | G06F 9/5027 |
| | | | | 709/203 |
| 2014/0280961 A1* | 9/2014 | Martinez | ................ | H04L 41/40 |
| | | | | 709/226 |
| 2014/0281511 A1* | 9/2014 | Kaushik | ................ | H04L 63/062 |
| | | | | 713/164 |
| 2017/0161044 A1* | 6/2017 | Singh | .................... | G06F 9/5083 |
| 2019/0317949 A1* | 10/2019 | Florissi | .............. | G06F 16/2471 |
| 2023/0041130 A1* | 2/2023 | Capalija | .............. | G06F 15/7807 |
| 2023/0109545 A1* | 4/2023 | Wilkerson | ............ | H04L 9/3263 |
| | | | | 713/175 |
| 2023/0367562 A1* | 11/2023 | Wilkerson, Jr. | ......... | G06F 9/541 |

OTHER PUBLICATIONS

Blair, "Middleware for Internet distribution in the context of cloud computing and the Internet of Things", 2016, Springer-Verlag France 2016 (Year: 2016).*

Thomsen, "Computational Abstraction Steps", 2010, Journal of Object Technology (Year: 2010).*

Lucknow, "Methods and Experiences for Developing Abstractions for Data-intensive, Scientific Applications", 2020, IEEE (Year: 2020).*

Farooq et al., "Operating systems for wireless sensor networks: A survey," Sensors 11, No. 6, 5900-5930 (2011).

Kecskemeti et al., "Modeling and simulation challenges in internet of things," IIEEE Cloud Computing, vol. 4, No. 1, pp. 62-69, Jan.-Feb. 2017.

International Search Report and Written Opinion, issued Jul. 27, 2023, in corresponding PCT Application No. PCT/US2023/021713.

Luckow et al., "Methods and Experiences for Developing Abstractions for Data-intensive, Scientific Applications," 2020 IEEE International Parallel and Distributed Processing Symposium Workshops (IPDPSW), New Orleans, LA, USA, 2020, pp. 636-645.

Blair et al., "Middleware for Internet distribution in the context of cloud computing and the Internet of Things," Ann. Telecommun. 71, 87-92 (2016).

* cited by examiner

SYSTEM AND METHOD FOR A HETEROGENOUS SOFTWARE PLATFORM

CROSS REFERENCE TO RELATED APPLICATIONS

The present is a continuation of U.S. patent application Ser. No. 17/662,951, filed on May 11, 2022, the contents of which are incorporated herein by reference in their entirety.

BACKGROUND

1. Technical Field

The present disclosure relates to software development, and more specifically to a framework for a heterogenous set of software services to operate in a uniform manner.

2. Introduction

Software application development life cycles continually become shorter and more complex. Additionally, software applications must manage ever-growing volumes of data split across multiple domains (application state, raw/intermediary data for analysis, metrics, user-submitted data, etc.) and often stored in a heterogeneous mix of services (databases, files, APIs (Application Programming Interfaces), etc.). Modern software applications consist of many individual services that must be configured, deployed, and managed at application launch. These services may expose APIs for internal and external communication in a variety of protocols, and the entire application can have numerous data types that it must track and advertise to other systems that interface with the application

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: storing, within a non-transitory computer readable storage medium of a computer system, a plurality of data types representing computational abstractions, the computer system further comprising: a plurality of heterogenous data storage engines; and at least one processor; building, via the at least one processor using the plurality of data types, the computational abstractions, the computational abstractions comprising: operations; environment; an event bus; and a workflow management system; and storing, within the non-transitory computer-readable storage medium, the computational abstractions.

A system configured to perform the concepts disclosed herein can include: a plurality of heterogenous data storage engines; at least one processor; and a non-transitory computer-readable storage medium having instructions stored which, when executed by the at least one processor, cause the at least one processor to perform operations comprising: storing, within the non-transitory computer readable storage medium, a plurality of data types representing computational abstractions; building, using the plurality of data types, the computational abstractions, the computational abstractions comprising: operations; environment; an event bus; and a workflow management system; and storing, within the non-transitory computer-readable storage medium, the computational abstractions.

A non-transitory computer-readable storage medium configured as disclosed herein can have instructions stored which, when executed by a computing device, cause the computing device to perform operations which include: storing, within the non-transitory computer readable storage medium of a computer system, a plurality of data types representing computational abstractions, the computer system further comprising a plurality of heterogenous data storage engines; building, using the plurality of data types, the computational abstractions, the computational abstractions comprising: operations; environment; an event bus; and a workflow management system; and storing, within the non-transitory computer-readable storage medium, the computational abstractions.

DETAILED DESCRIPTION

Figure 1:
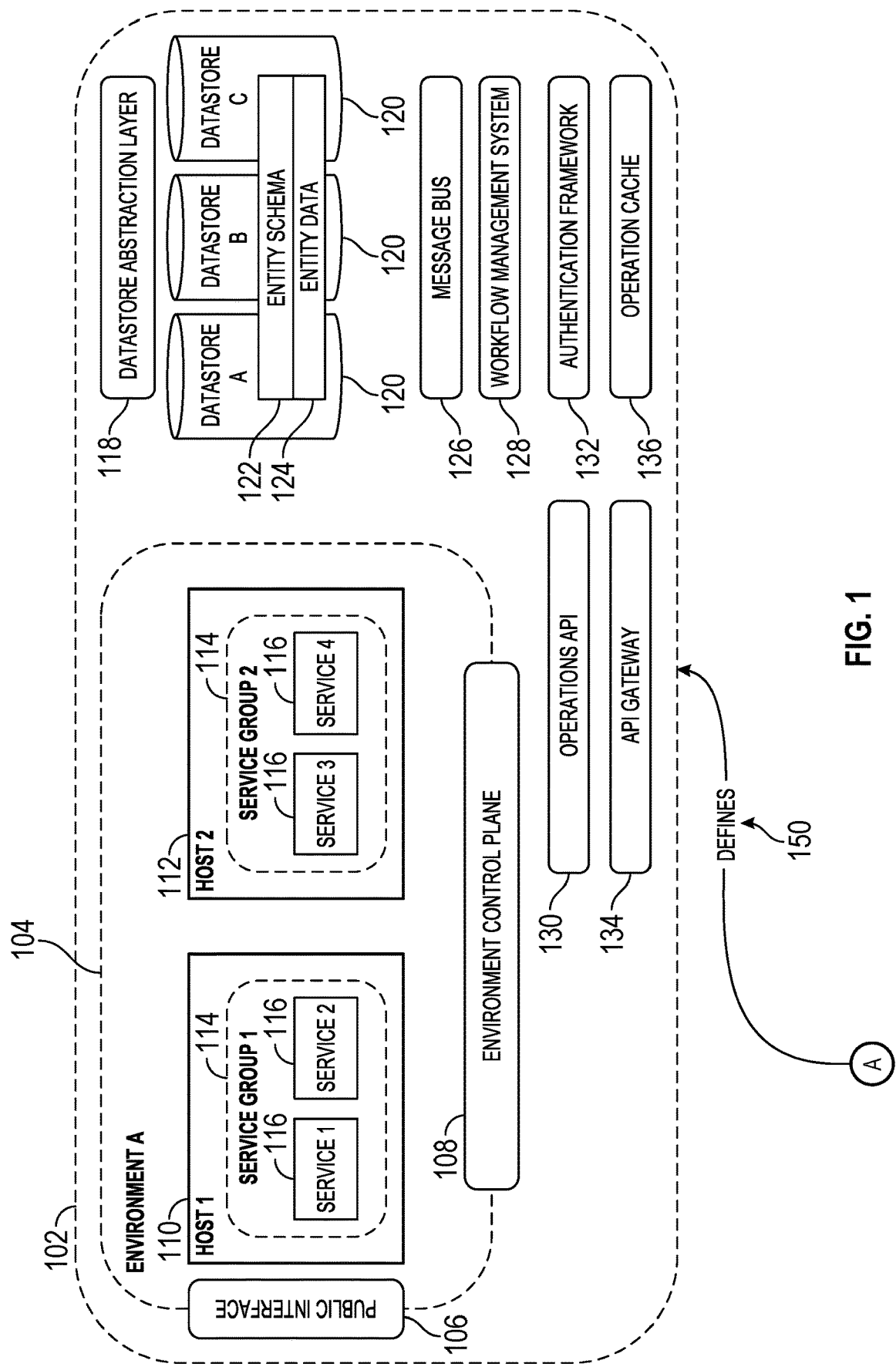
FIG. 1 illustrates an example diagram of abstract entities disclosed herein.
Figure 1:
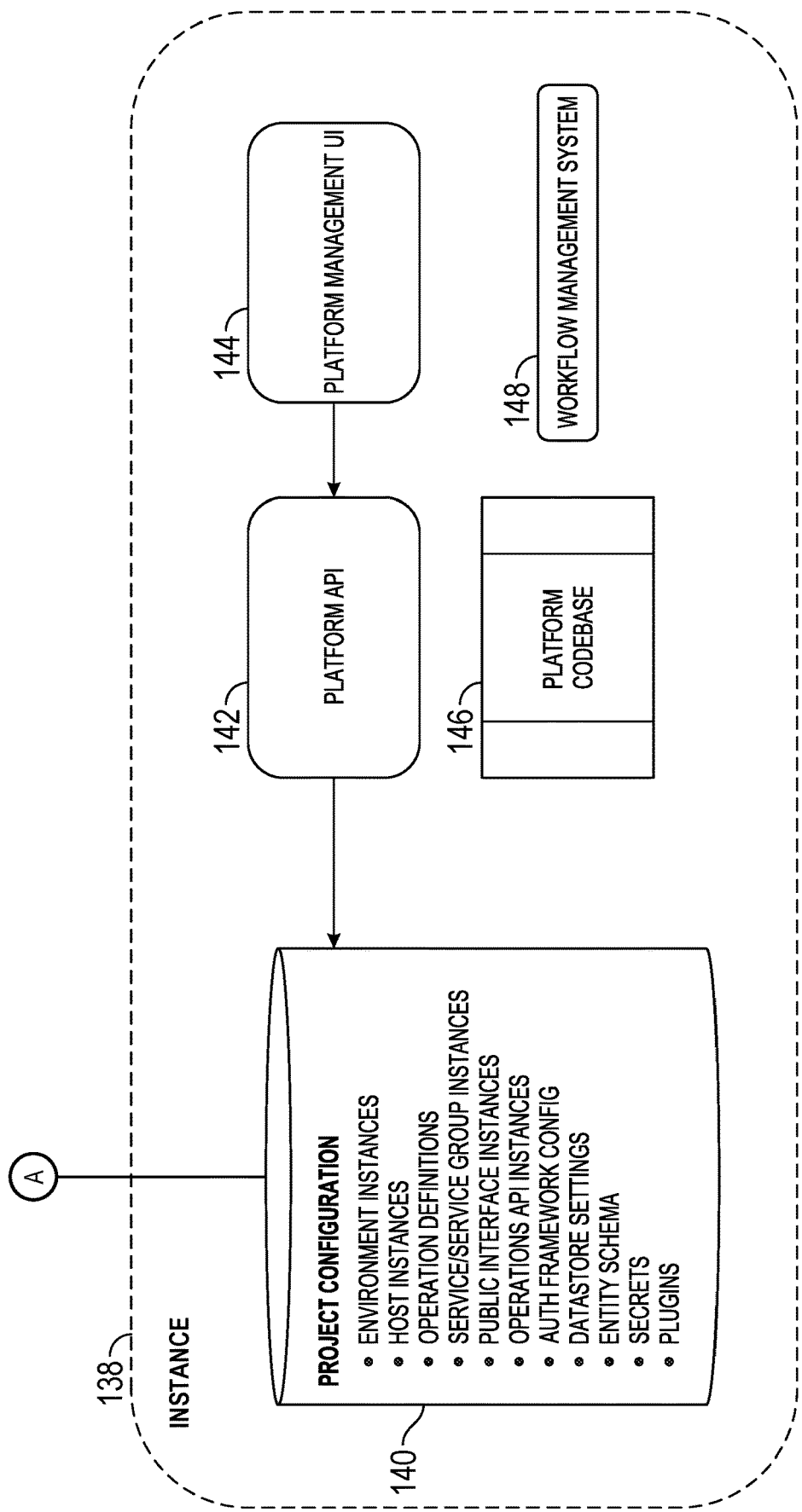

Various embodiments of the disclosure are described in detail below. While specific implementations are described, this is done for illustration purposes only. Other components and configurations may be used without parting from the spirit and scope of the disclosure.

Systems, methods, and computer-readable storage media configured as disclosed herein provide a unified framework for addressing the problems discussed above. Specifically, systems configured as disclosed herein offer a unified framework, reducing overhead for teams to achieve their desired goals, whereas the disparate tools of other solutions are often not designed to work well with each other, which inevitably results in many workarounds and custom "hacks" to bring the systems into perfect alignment.

The system disclosed herein uses key abstractions that are brought together in a way that ensures that the framework succeeds today, but can also adapt to future advances in software engineering. Due to the solution's architecture, modules can be brought online or discarded as new frameworks become dominant in the software industry. The system treats the entire software ecosystem as data, including definitions for the data types underpinning the framework, and stores all data transparently across a heterogeneous mix of data storage engines (databases, files, APIs, etc.). The core system depends upon a set of foundational entities codified in a codebase as "Types." Because these Types are programming/coding language-agnostic and stored in the system as data records, the system can build APIs that allow users to manipulate and reload types at runtime.

Using these types, the system can build abstractions to represent common elements of application ecosystems (Environments, Services, Operations, etc.) which can then be stored in the same heterogeneous storage system (because they themselves are types). Operations allow users to design system APIs as data, as they are records in a storage system that define the input/output and functional handler for all actions that can be taken within the system.

An instance within the system contains a minimum set of base services required to allow users to construct their desired system. These base services can include:

Datastores
Operation API Service and router
Authentication and caching framework
Workflow management system
Message bus Non-limiting examples of system components can include:

type definitions stored as data (as opposed to code)
classes, where the code for the classes is generated from the type definitions
abstractions such as: Environment, Event Bus, Workflow Management System, Datastore, Service, State Plan, Operation API, Operation, Secret Datastore, and Plugins A "Project" is the top-level organizational entity within the system. Types, users, environments, and datastores are examples of other entities that are scoped to a single Project.

The "Environment" abstraction enables the system to act on services (parts of an application) across computational ecosystems, and adopt new ecosystems as they are introduced (e.g., if AWS ("AMAZON WEB SERVICES") introduces a new computational model the system can develop a new environment abstraction to control software and infrastructure in that new model). For example, an environment can be a logical grouping of physical and/or virtual resources where system work can be accomplished. Services can be deployed into Environments, whether they are deployed onto a Host in the Environment or are "serverless." Services can be exposed outside an Environment via Service Exposures attached to an Environment's Public Interface. An Environment's Control Plane implementation can execute State Plans to place a Service in a desired state.

The "Event Bus" abstraction can allow discrete services within the system to communicate with each other in any protocol implemented by the system, without individual developers having to write their own communication layer for each application.

A "Workflow Management System" abstraction can allow for asynchronous orchestration of work as pipelines in any Environment previously developed within the system. The Workflow Management System has full access to the other abstractions of the platform, enabling automations such as changing the way types and operations are defined based on some condition or rule.

Each instance executed by the system can contain a Workflow Management System that provides the ability to perform asynchronous work and to create processing workflows arranged into dependency graphs. The Workflow system can expose a set of built-in Operations for managing work through pipelines as well as manipulating data artifacts used as input/output in workflow steps. The Workflow system can be built on top of type and datastore abstractions, meaning that all workflows are stored as data rather than code (defining the workflow as data rather than code changes the effort of building a workflow/pipeline from a coding exercise to a configuration exercise) and that all types involved in defining a workflow can be modified via type management operations.

The "Datastore" abstraction can store the system-related entities, including Type definitions, Projects, Environments, Services, Hosts, etc. This datastore must be brought up alongside an instance to hold the initial description of Projects that the instance will be responsible for maintaining. This datastore is preferably provisioned a source-available cross-platform document-oriented database program. In some configurations, the datastore can be a NoSQL (also known as "non-SQL") database program (meaning that the database uses a storage/retrieval system other than the tabular relations used in a relational database), and can use JSON (JavaScript Object Notation) or JSON-like documents with optional schemas.

Unlike many of the other abstractions, the datastore does not descend from a "BaseType" (i.e., datastore abstractions are not directly storable in a database or other storage system). Instead, these entities constitute the abstraction layer between the system data models ("Types") and storage destinations for those models (databases, file systems, APIs, etc.). Each process that runs the system's "initialize( )" setup function can have a global "Datastore Set" for the process, which can contain pointers to the various Datastores configured for the system project the process is running in, and which will be used for performing Type operations (load, save, etc.).

The "State Plan" abstraction defines the work required to bring a Service into a particular state. State Plans are intended to be independent and are written to be compatible with particular Environments' Control Planes. The most used State Plans for most Services are those that enforce the "deployed" and "not deployed" states. State Plans can be written to be highly parameterized and read configurations from an associated Service, such that most users do not need to manually modify State Plans to achieve their goals.

The "Service" abstraction represents a configuration and/or code for performing some amount of work within the system. Service definitions can utilize the system's flexible Type system to allow for rapid updates to service configuration. The Service state within a Project is managed by applying the State Plans provided for a given Service.

The "Operation API" abstraction can read definitions and generate APIs in multiple frameworks for exposing the Operations for a given instance.

The "Operation Router" abstraction is responsible for determining which Service provides the implementation for each Operation, and ensuring that exposed routes terminate either at the Operation API Service or some other implementing Service. As the Operation Router receives and reviews requests for operations, it can submit the requests to the authorization and caching extensions for processing.

The "Operation" abstraction is the foundational abstraction for performing work against and in an instance. Operations define the input/output schemas, handlers, and services implementing their functionality as data within a datastore, and can be used for API design and implementation. Operation instances stored in a datastore can define the input schema, output schema, handler, and backing Service for a particular Operation against an application managed by the system. The OperationsAPI abstraction can read these definitions when auto-generating endpoints in various API frameworks. Note that an Operation does not have to be provided by the Operation API Service, and could be provided by another Service in the instance.

The "Secret Datastore" abstraction is central to the operation of a system instance, and is designed to store and encrypt sensitive data in transit and at rest. Secrets include things such as SSH (Secure Shell) keys, sensitive user credentials, and connection URIs (Uniform Resource identifiers). The system stores the connection details for the primary datastore within the Secrets framework, and thus a default Secrets datastore can be required for each instance. Any datastore (cloud-based or otherwise) that implements the required security protocols can suffice.

A primary need of most modern software systems is transporting state details and other events both between components of a system and between system components and to external sources/destinations. The "Message Bus", together with message-oriented Operations, provide an abstraction layer for sending and receiving messages. The Message Bus can be implemented using an open-source message exchange server, and can integrate with the Type system disclosed herein to provide flexible schemas for message types and a standardized way to address services and subscribe to classes of messages.

The "Plugin" abstraction provides the ability to extend to the capabilities present within the core framework. The Plugin definition defines the source for these customizations (typically an online repository), as well as the version and any credentials required to access the Plugin at install/run time.

A "Public Interface" abstraction layer can expose Services within an Environment to anything outside of the Environment. Each type of Environment can have its own corresponding Public Interface. Non-limiting examples of a Public Interface can include an API gateway or firewall software.

The "Type" system provides capabilities to the shape of data as a language-agnostic schema and a set of Operations to mutate that schema both before and during runtime for a particular process. Each Type has a configuration, nested inside the Type's definition as an attribute. This configuration (aka "TypeConfig") allows for setting language-specific options for the type, as well as modifying how and where instances of the Type are stored/loaded data storage engines. Type definitions can be stored in system's primary datastore for any given instance, such as a database or other NoSQL server. Operations against these definitions are exposed via the system's Operations API, in each of the API frameworks.

Type definitions are, preferably, stored in a JSON format, with Types being in their language-agnostic definitions. In a JSON format, Type definitions are represented as an object. This object contains key named attributes, which is a list of objects containing language-agnostic Attribute definitions. There is additionally a type_config (aka "TypeConfig") key, which contains an object representing the TypeConfig definition. Finally, Type definitions contain a name key which is simply the name of the Type, pulled from type_config.

The TypeConfig configures options about the Type the configuration is attached to. In a Type definition, the configuration is nested as a key-value mapping representation. Language-specific implementations can then utilize this representation to attach the configuration to the appropriate Type at runtime. For example, a Python implementation can construct a nested class called TypeConfig for each Type, and the options for the type configuration are made into attributes for TypeConfig.

Exemplary Type configurations can include:

| Option | Description |
| --- | --- |
| Typename | (string) A machine-friendly name for the type. Typically this is in Python's "snakecase" (lowercase with _ separators between words). |
| Parents | (list → string) A list of parent typenames for this Type. |
| Abstract | (Boolean) Whether or not this Type is abstract. If True, then the expectation is instances of this Type are never created |
| System_type | (Boolean) Whether or not this Type is a system type. System types have certain special treatments that will be outlined elsewhere in this documentation |
| Instance_store_name | (string) The name of the instance store that instances of this Type should be stored in. This is often generated from the typename in many languages and is used during type mapping to datastores. |
| Serializer | (string) A dotted path to where the serializer for this Type should be found. This is often language specific. The serializer converts system data objects into code-native data objects (such as data objects in Python) so that the data can be exported across the application process boundary into a file or some other storage. For examplewriting serialized instances of Types to JSON files. |
| Validator | (string) A dotted path to where the validator for this Type should be found. This is often language specific. |
| Polymorphism | (object) A nested object that controls the polymorphism behavior for the Type. |
| Data_store_affinity | (object) A nested object that controls how the framework determines which Datastore to store instances of the Type into. |

Polymorphism settings can, for example, define two options: "group" and "on," which together control how language-specific implementations resolve raw datastore records to instances of the appropriate class at the time of executing list and list single operations. "On" is the name of an attribute on the Type that is used to map datastore records to the Type at record fetching time. The default value of the attribute pointed to by on can be used as the discriminant for the Type. Most configurations will utilize a lookup table in the form: {group: {Type.on.default_value: Type}} and then inspect the datastore record's value for the on attribute to perform a lookup into the table. "Group" is the name of the polymorphic group the Type belongs to. Polymorphic groups are singly-rooted trees where the root Type has a default value of null for the attribute pointed to it by on (i.e. Type.on.default_value=null). Within a group, it is illegal for two Types to have the same default value for the attributed referenced by on.

The Polymorphism framework allows for instances of multiple concrete Types to be stored together in a datastore, and for the appropriate Type class for each record to be used to when creating instances. For example, consider the following list of Type classes:

Dog(BaseType)
Shibalnu(Dog)
GermanShepherd(Dog)
Pointer(Dog)
GoldenRetriever(Dog)

A user may want all the types of dogs to be stored in a single instance store, but when fetching Dog records from that instance store wants the specific Type of Dog used to create instances. The polymorphism system allows the user to do that by creating a polymorphic group for dogs (which includes Dog and all its subclasses) and marking an attribute on the Dog class as a discriminant attribute. The default value of that attribute on each specific dog type can then be used to identify datastore records as coming from that type of dog. For example, a Dog class can create a polymorphic group dogs, and the user can use the system to use type_of_dog as the attribute on all Dog subclasses to use when figuring out which type of Dog is contained in a particular database record.

The Type attributes are the basic units from which the Type is constructed. Base attributes include:
   name (string)—The name of the attribute. Should be unique across all attributes on a given type.
   label (string)—A default label to use when displaying this attribute in user interfaces. name will be used if this is not provided.
   help_text (string)—Text containing any useful information for end users/consumers of this attribute.
   required (Boolean)—Whether or not this attribute must be provided when an instance of the type containing this attribute is created.
   data_type (string)—The system type identifier for this attribute. Examples include: string, reference, int (integer), float, and Boolean
   default (any)—The default value this attribute should take when it is not provided at type instance creation time.
   unique (Boolean)—Whether or not uniqueness across all values of this attribute should be enforced.

The "List" data type allows for storing lists of other entities. Stored entities can either be scalar (strings, integers, etc.) or complex (lists, nested, mappings, references, etc.). Heterogeneous lists are possible if the stored type is nested or reference, and the referenced or nested Type is the root of a polymorphic group (any member of that group is then a valid member of the list).

At runtime, the system Types are a combination of their language agnostic definition and definitions found in language-specific code files. A given attribute on a Type can come from either of these definitions, as well as any ancestors that might have defined the attribute (assuming this Type does not override the attribute). Given a language-agnostic representation, the system can dynamically generate a Type class at runtime by converting each attribute in the definition's attributes key to one of the Python attributes defined the attributes and constructing a TypeConfig class using a type constructor on the configuration present in the type_config key. A Type's configuration can include a list of parents—if provided they will be used as parent classes when constructing the new class, otherwise the new class will inherit directly from a "BaseType."

The BaseType is the ancestor of all other Types in an executing process within the system. Data records in a datastore correspond to an instance of one of these classes. BaseType can implement a standard API for both Types and data instances, including operations for performing operations on Type instances and converting between classes and language agnostic Type definitions. The BaseTypeMeta class is responsible for enforcing rules around Types at class creation time, making, sure attributes are inherited properly, introspecting Type polymorphism settings, registering types in the Type Registry, and various other housekeeping operations. The BaseType implements class methods to convert Type definitions into the Type classes, and to produce language agnostic Type definitions from Type classes.

CRUD (create, read, update, delete) operation implementations are used within the system, and each Datastore can provide list, insert, update, and delete methods to implement CRUD functionality. At this layer in the framework there are no notions of Types or Type instances, and these CRUD methods operate using instance store names as strings, insert/update data as dictionaries, and search parameters as Search Syntax dictionaries. Exemplary methods include:
   list—Takes an instance store name, search parameters, and some pagination arguments and returns a list of raw datastore records from the instance store matching the search parameters.
   insert—Takes an instance store name and a dictionary of data and inserts it into the Datastore.
   update—Takes an instance store name, a data dictionary, and search parameters and performs an update of all records matching the search parameters.
   delete—Takes an instance store name and search parameters, and deletes records in the Datsatore matching the search parameters.

Through the system Type and Datastore frameworks, the system provides support for utilizing the same set of models as an application moves between different data storage paradigms. The system can also allow for the use of sets of Datastores, with a subset of Types each being handled by a different Datastore in the set. Types can be mapped to the Datastore responsible to their storage via records in the primary system datastore, which allows these mappings to be updated as a configuration modification. Datastore sets can be implemented in a "DatastoreSet" class. When the system is initialized, the system can examine the system Instance Configuration and fetch the set of Datastores configured for the instance. For each Datastore found, the system can then make an instance of the appropriate Datastore class and add the new instance to a session DatastoreSet object. This global set of datastores can then attached to the datastore module in the a session-datastores attribute. The DatastoreSet can support all of the methods defined on individual Datastores, and can contain logic to route the method call to the correct Datastore for a particular Type (if present in its internal data structure). This means that DatastoreSet can be the primary integration point between the Type and Datastore layers of the system framework. The Type layer utilizes the session datastore set exclusively to handle list, save, and delete operations on Type instances. The DatastoreSet object can use Type-Registry and/or Type-Mappings to determine which Datastore in its membership should be used to satisfy a particular datastore method call.

A mapping must be maintained between a Type and the Datastore currently persisting instances of that Type in an instance store. TypeMappingEntry instances can be stored in the primary system datastore to hold the mapping between a typename and the name of the datastore holding instances of the Type. These mapping entries can be manually created via system operations.

The TypeRegistry can implement a datastore_for_type method that utilizes these mappings to determine which Datastore in a DatastoreSet should be used, when given a Type class. If the method cannot find a TypeMappingEntry for the provided Type, it will create one using the rules in the a resolve_datastore_affinity method. This method uses the Type's datastore_affinity type configuration value to select a suitable Datastore from the DatastoreSet. If a suitable Datastore cannot be selected, the TypeRegistry will fall back to storing the Type in the system's primary Datastore.

FIG. 1 illustrates an example diagram of abstract entities disclosed herein. As illustrated a the system 102 (which can be any computer system configured to perform the concepts disclosed herein) can contain various abstractions. The abstractions can include an Environment 104 with a Public Interface 106. Within the Environment 104 are specific hosts 110, 112 (which can be specific servers, cloud-based/serverless computing systems, etc.), which can each contain service groups 114 and specific Services 116. The Environment 104 can selected and controlled using the Environment Control Plane 108. The project 102 can also include a DataStore abstraction layer 118, as well as various datastores 120, the entity schema 122, and the entity data 124. Other abstractions can include the message bus 126, the workflow management system 128, the authentication framework 132, the operation cache 136, the OperationsAPI 130, and/or the API gateway 134.

An instance 138 can be introduced to the system 102, where the instance 138 contains a project configuration 140, a platform API 142, the platform management UI (user interface) 144, a platform codebase 146, and/or a workflow management system 148. Exemplary information within the project configuration 140 can include Environment instances, Host instances, Operation definitions, Service/Service group instances, Public Interface instances, Operations API instances, Authorization Framework configurations, DataStore settings, Entity schema, Secret's information, and/or information regarding Plugins.

Figure 2:
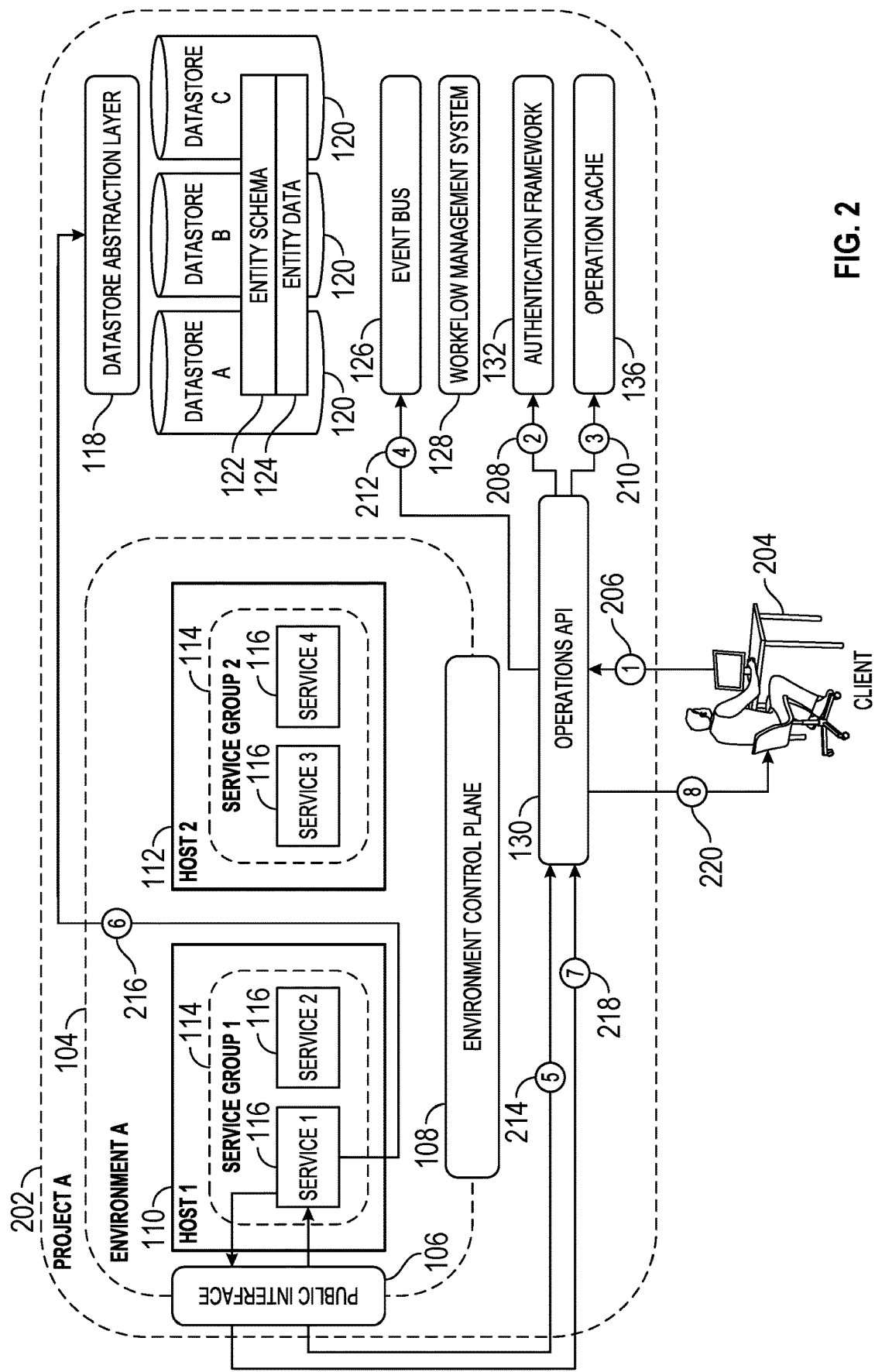
FIG. 2 illustrates an example operations flow using an abstract entity.

FIG. 2 illustrates an example operations flow using an abstract entity. In this example, a user operating a client device 204 initiates a particular project 202. This can, for example, occur by the user providing the instance information illustrated in FIG. 1. The user provides a request to perform certain operations (1) 206, which are received by the system's Operations API 130. Each Operation has a setting that determines which Service 116 is responsible for responding to requests through the Operation API 130 for that Operation. This enables the system to change the Service 116 responsible for a given Operation on the fly.

All of the Operations exposed via the OperationsAPI 130 are present as data records in one of the Datastores 120 behind the Datastore Abstraction Layer 118. This means that the user (via the client device 204) can create new operations and configure existing operations at runtime, then reload the OperationsAPI 130 to make changes without having to write any code. The input and/or output of each Operation can be encoded as a system Type and thus can be modified by utilizing the Operations for editing Types.

The Datastore Abstraction Layer 118 allows the system to have a single representation of a Type's schema and behavior while allowing for storing/loading of that Type from any data storage engine that the system supports (e.g., the system can write a new storage module for each new type of storage). The mapping between a Type and the datastore 120 responsible for its storage is stored as configuration within the system, such that a user (operating the client device 204) can freely migrate a Type's data between various storage locations without having to modify the code. This is in contrast to other frameworks in which developers/users must have a representation of each Type in code for each of the data storage locations.

The initial request 206 causes an authorization request (2) 208 to be sent to the Authentication Framework 132, and if the authorization is approved a request (3) is made to the Operation Cache 136 to lookup previously cached data. The cache contains, for example, the results of recently executed operations (such as if the operation produces a result for the end user) using a LRU (Least Recently Used) cache implementation. The Operations API 130 then broadcast the Operations Execution event (4) to the Event Bus 126, which can ensure that other abstractions/entities are aware that the operation will be executed.

The Operations API 130 then dispatches (5) 214 the operation to an implementing service 116 via the public interface 106. The service 116 uses (6) 216 a datastore library found in the datastore abstraction layer 118 to perform the data operations. Once the operation is completed by the service 116, the results (7) 218 are communicated through the public interface 106 back to the Operations API 130, which in turn returns the results (8) to the user's client device 204.

Figure 3:
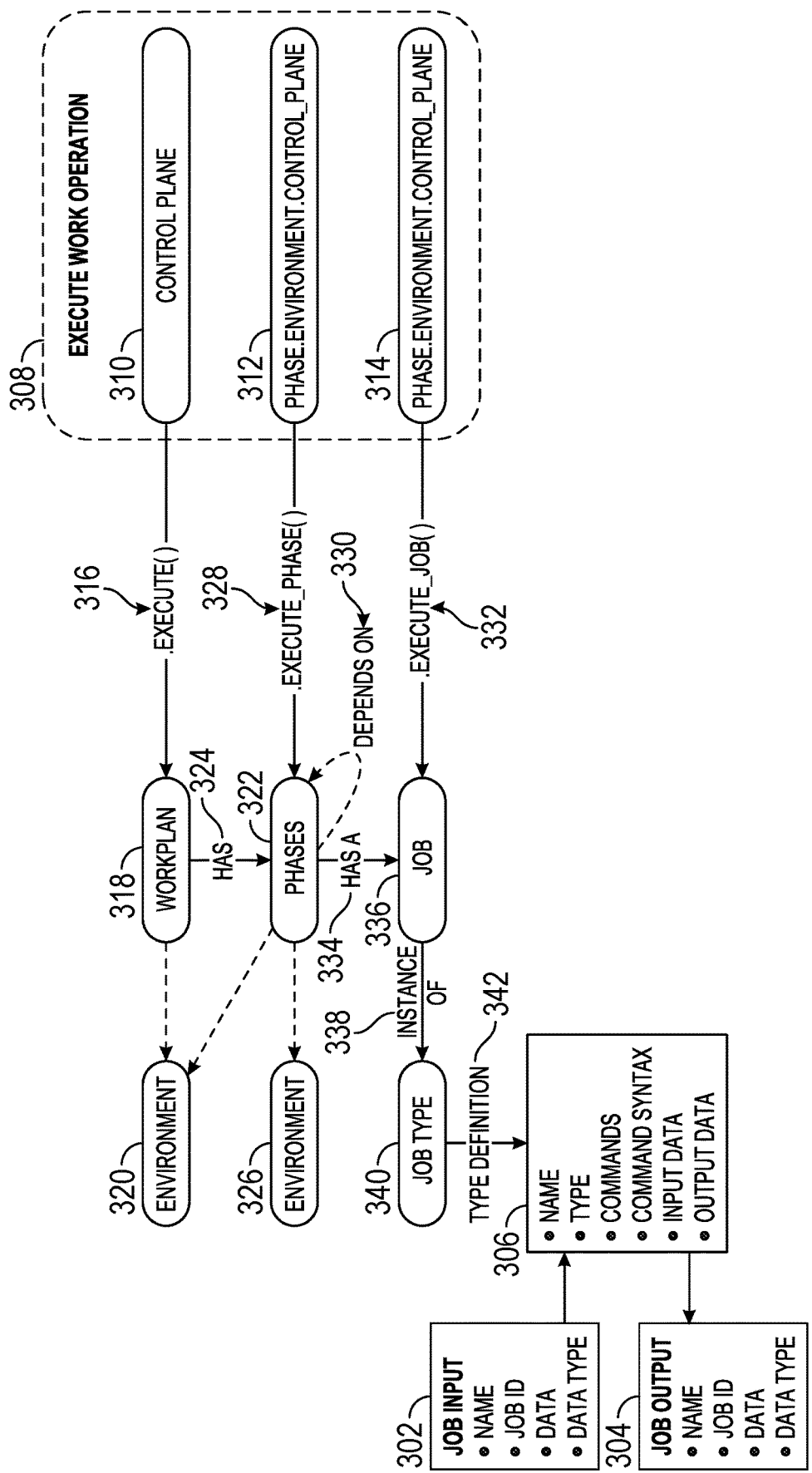
FIG. 3 illustrates an example of workflow management as disclosed herein.

FIG. 3 illustrates an example of workflow management as disclosed herein. Workflow management, as illustrated, can receive a job input 302 containing metadata such as a job name, a job ID, job data, and job data types. Alternatively, the workflow management can output a job 304 with similar metadata (name, job ID, data, and data type). The input/output control 306 of the workflow management can use the name, type, commands, commands syntax, and input/output data to direct how workflow for a given job should be executed. For example, work operations can be executed 308 using a control panel 310, with additional phase-specific control panels 312, 314 available based on the needs of a given job (while two exemplary phase control planes are illustrated, additional or fewer such control planes are possible). The system causes the work plan 318 to be created 316 according to the instructions received via the control plane 310. Job Data (both input 302 and output 304) and the Control Plane 310 have a relationship where the Control Plane 310 is responsible for localizing the Job Input 302 to wherever the Job 336 is executing, and after the Job 336 finishes the Control Plane 310 is responsible for discovering any resulting Job Output 304 and retrieving it from the Job's execution environment 314. The workplan 318 has phases 322 which have their own environment(s) 326, those phases 322 having been created based on the phase environment defined within the control plane 312. In some instances, these phases 322 can depend upon themselves 330 in a self-referencing manner. The phases 322 can be linked to a job 336 executed 332 by another phase environment of the control plane 314. The relationships between the workplan 318, the phases 332, and the job 336 can define qualities the respective abstractions have. For example, the workplan 318 "has" 324 phases 322, which in turn "has a" 334 job 336. The job 336 is an instance of a job type 340, which has a type definition 342 identified within the input/output control 306 for the workflow management.

Figure 4:
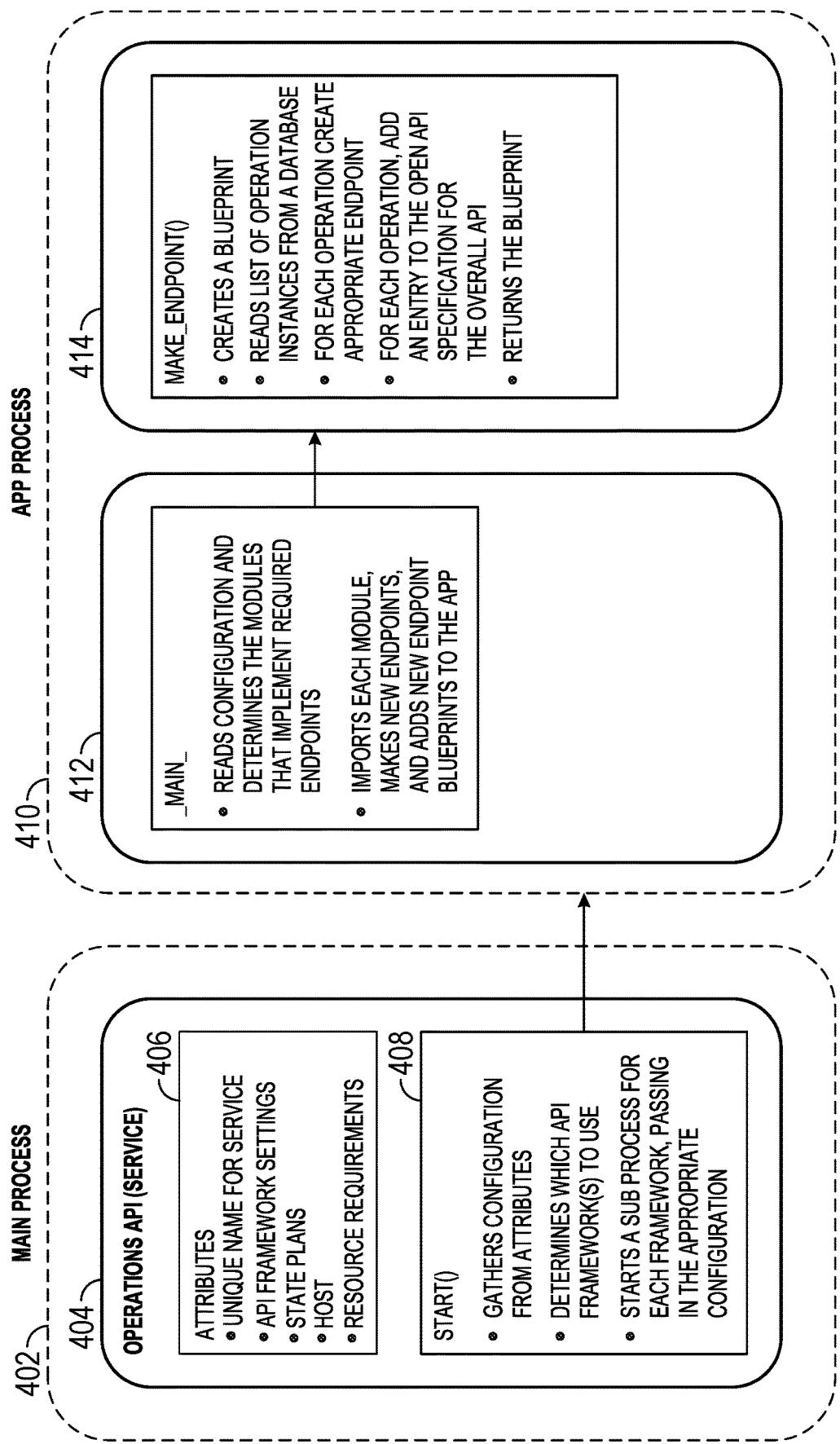
FIG. 4 illustrates an exemplary operations Application Programming Interface (API)

FIG. 4 illustrates an exemplary operations API. In this example, the main process 402 has an Operations API (Service) abstraction 404. Within the Operations API (Service) abstraction 404 are attributes 406 which can define how the service is executed. Exemplary attributes 406 for the OperationsAPI (Service) 404 can include: a unique name for the service, API framework settings (e.g., REST (Representative State Transfer) settings, GraphQL (Graph Query Language) settings), state plans for managing the OperationsAPI 404, the host(s) the OperationsAPI 404 is deployed on, the environment(s) the OperationsAPI 404 is deployed into, and resource requirements (e.g., CPU (Computer Processing Unit), memory, storage, networking, etc.). When the Operations API (Service) 408 is executed 408, it (1) gathers configuration information from the attributes 406, (2) determines which API framework(s) to use, and (3) starts a sub process for each framework, passing in the appropriate configuration. The "App process" 410 then then (in a main process 412) (1) read the configuration and determine the modules that are implemented require endpoints, and (2) import each module, making new endpoints, and adding those new endpoint blueprints to the app. To create an endpoint, a specific algorithm/sub-routine "make_endpoint()" can be executed. In this algorithm, a blueprint is created, and a list of operations instances is read from a database. For each operation an appropriate endpoint is created, and for each operation an entry is added to the open API specification for the overall API. This updated blueprint is then returned to the main 412 algorithm of the app process 410.

Figure 5:
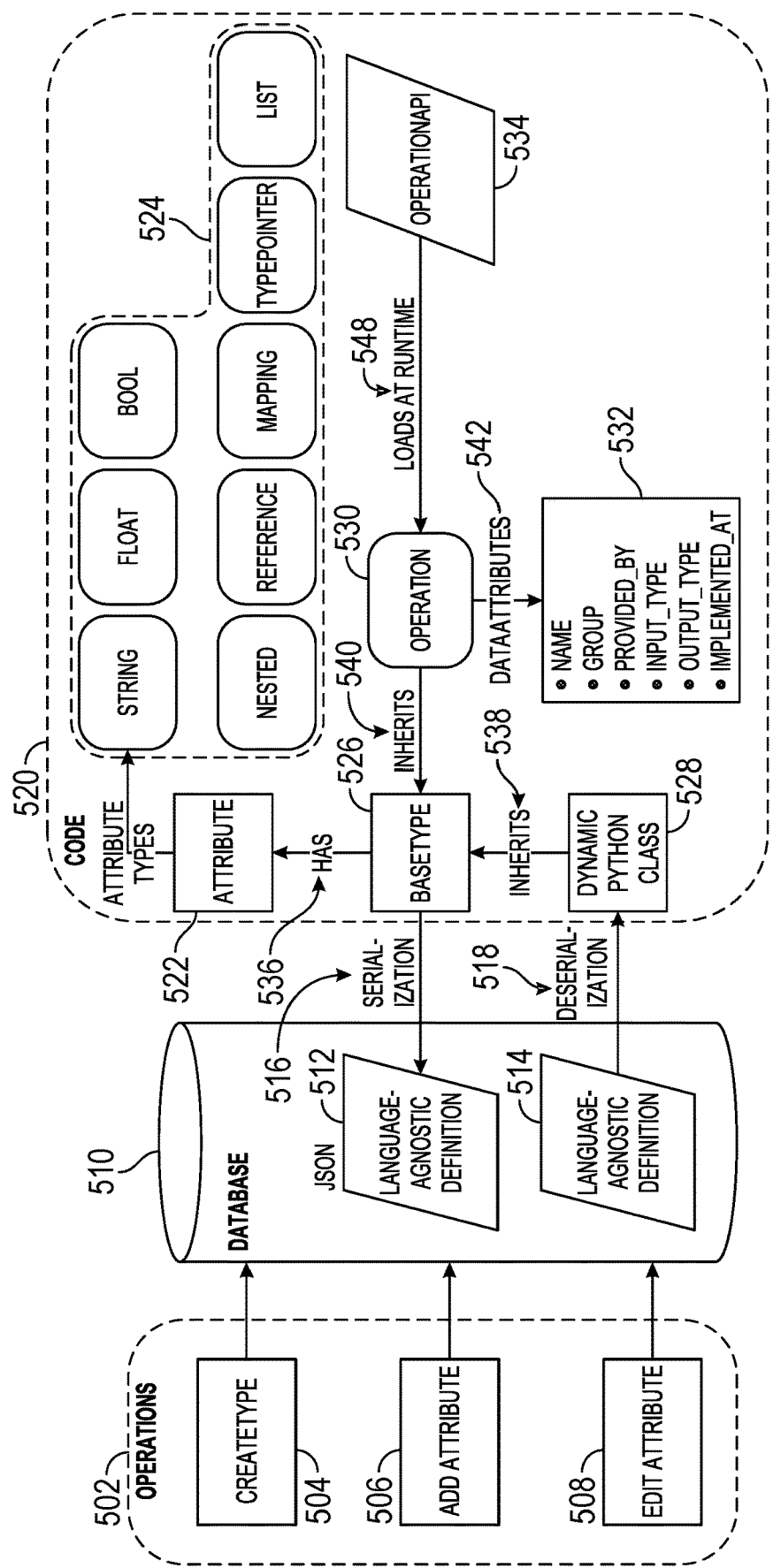
FIG. 5 illustrates an example type system.

FIG. 5 illustrates an example type system. In this example, Operations 502 are being saved to a database 510. The Operations 502 include the ability to create a new type 504 for the operation, to add attributes 506 of the operation, and/or to edit the attributes 508 of the operation. The operation 502 is saved in the database 510 is a JSON or other language-agnostic definition 512, 514. The database 510 can interact can further interact with the system 520 to modify how the language agnostic definitions operate.

Serialization can be defined as going from a language/framework representation to a simpler text representation that can be moved outside of the running process (i.e., going from system objects to JSON). Deserialization is the reverse—starting from JSON or some other text representation and ending with a system object. Here, for example, in some cases, the language agnostic definition 514 can be deserialized 518, resulting in a dynamic python (or other programming language) class 528. This dynamic class 528 can inherit 538 a basetype 526, which can in turn be serialized 516 and again stored in the database 510 as a language agnostic definition 512. The basetype 526 can result from an Operations API 534 which loads an Operation 530 at runtime 548. The Operation 530 can have 542 attributes such as the name, group, who provided the operation, the input/output types 532, and/or where/how the Operation 530 is to be implemented. The basetype 526 can then be based on the Operation 530, inheriting 540 the attributes 532 and/or other qualities of the Operation 530. The basetype 526 can have 536 attributes 522 such as the attribute type 524 listed (non-limiting examples can include, as illustrated, String, Boolean, Float, Nested, Reference, Mapping, TypePointer, and/or List).

Figure 6:
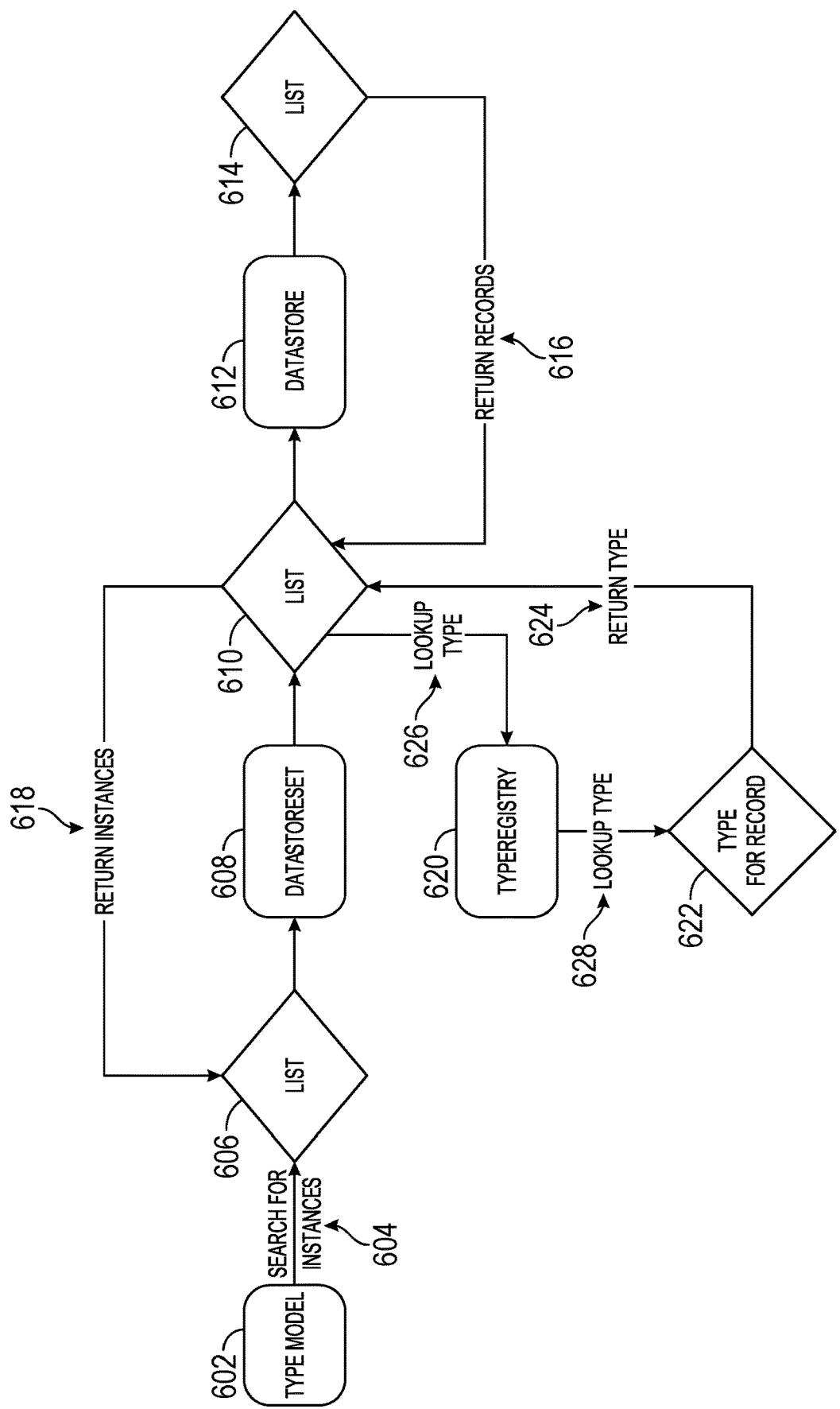
FIG. 6 illustrates a first example of polymorphism.

FIG. 6 illustrates a first example of polymorphism. Services are a great example of polymorphism in action. The system has many types of Services, each with their own configuration needs and runtime behavior. However, each of these Services are stored in a single collection of data records in a database. At runtime, the system examines a data record and determines which Service the record corresponds to so the correct class can be loaded (imparting the proper schema and runtime behavior). The polymorphism system maps a particular value of an attribute in the data record (in the case of Services this is the "service_type" attribute) to a specific system Type. For example, the OperationsAPI has a value of "operations_api" for the "service_type" attribute. In the illustrated example, a model type 602 is received and the system searches for instances 604, resulting in a list 606 of instances where the model type 602 is identified. Using that, the system can compare that list to those stored in a DataStoreSet 608, resulting in an updated list 610, which can allow for instances to be returned 618 to the original list of searched instances 606. In addition, the updated list 610 can be used to lookup the type 626 for instances within a type registry 620. The lookup type 628 can be used to identify specific types of records 622, which can be returned 624 to the updated list. In addition, the updated list 610 can be used to search within a datastore 612, and the resulting list 614 can again be returned 616 to the updated list 610.

Figure 7:
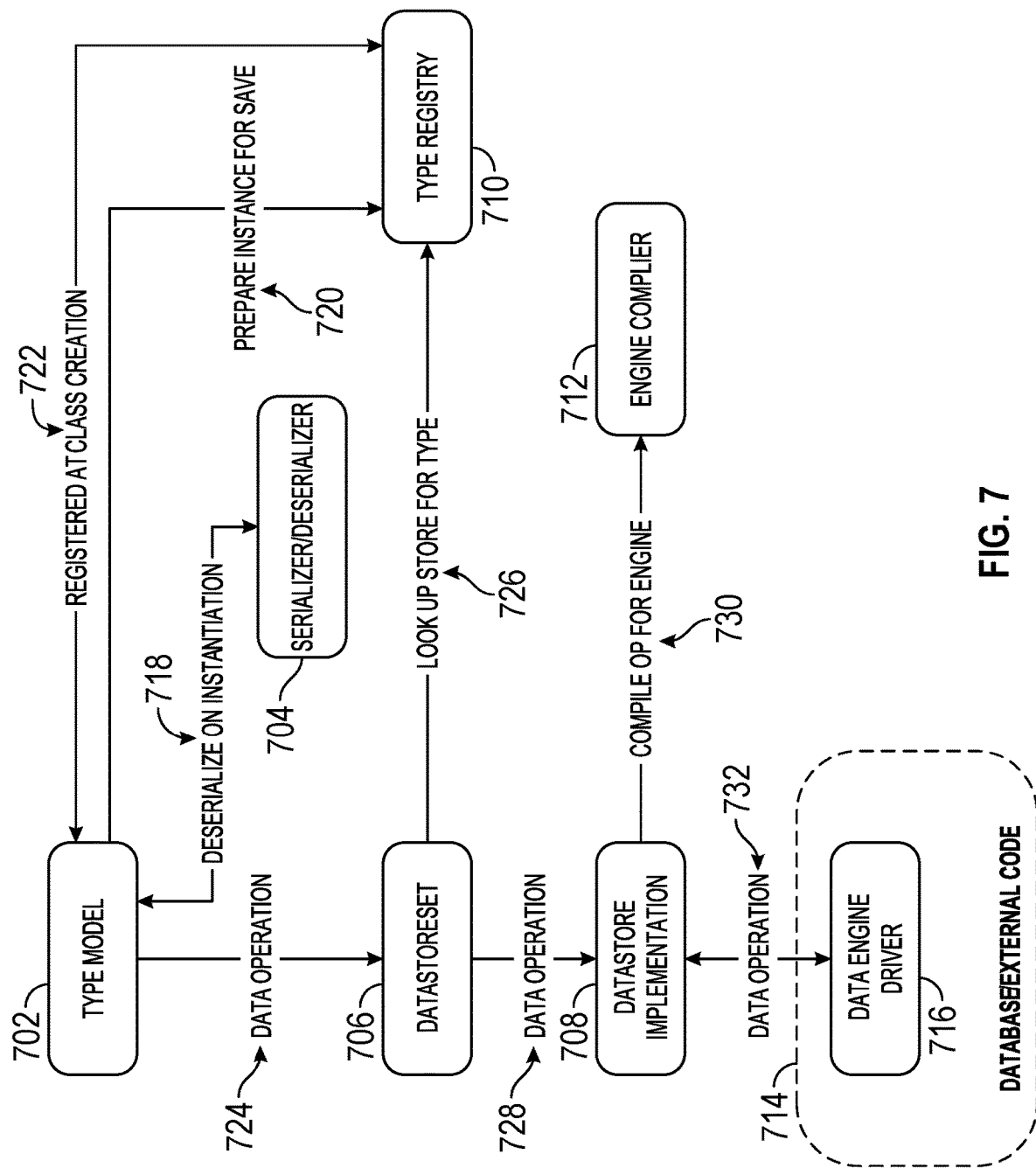
FIG. 7 illustrates an example of data operations on types.

FIG. 7 illustrates an example of data operations on types. In the illustrated example, a given type model 702 is provided which can be used for a data operation 724. The resulting data can be stored as a DataStoreSet 706. In some cases, the system can look up in a store based on the type of data 726, allowing the data to be stored in a type registry 710. The type registry 710 can also be used to prepare instances for saving 720 and/or registered class creation 722. The type model can also be used with the serializer/deserializer 704, as described above.

The data stored in the DataStoreSet 706 can be used for another data operation 728, resulting in a DataStore implementation 708. This data operation 728 can be compiled for an engine 730 by an engine compiler 712, or can be used for yet a different data operation 732 for a data engine driver 716 associated with a database and/or external code 714.

Figure 8:
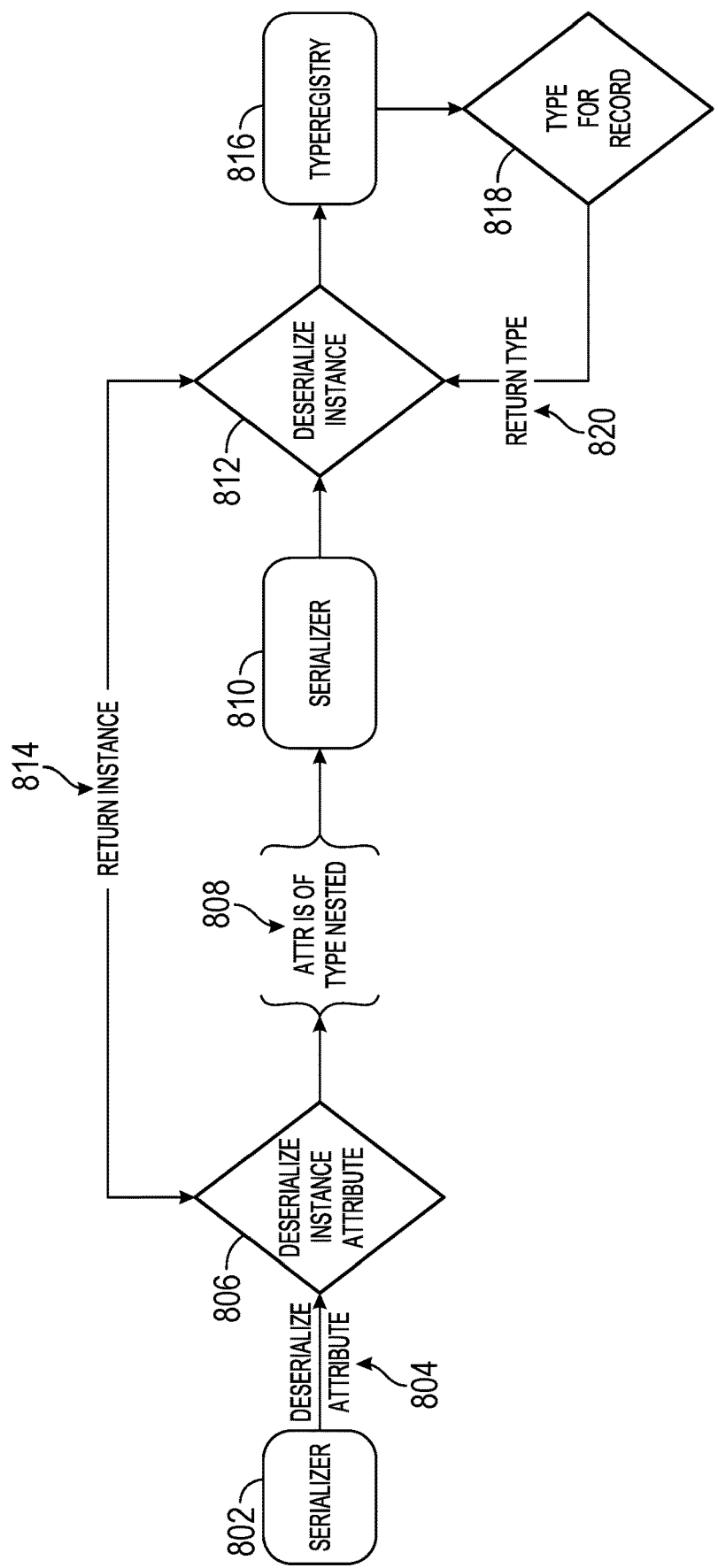
FIG. 8 illustrates a second example of polymorphism.

FIG. 8 illustrates a second example of polymorphism. In this example, a serializer abstraction 802 outputs data associated with an instance, and the system deserializes at least one attribute 804, resulting in a deserialized instance attribute 806. The system determines if that attribute is of a type which is nested 808, and if so performs an additional serialization via a serializer 810. At this point the newly identified instance(s) are again deserialized 812, and the resulting instance can be returned to the previous 806 execution of instance attribute deserialization 806. The system can also examine the TypeRegistry 816, identifying the type for the instance/record 818, and that type can be returned 820 to the results of the later instance deserializing point 812.

Figure 9:
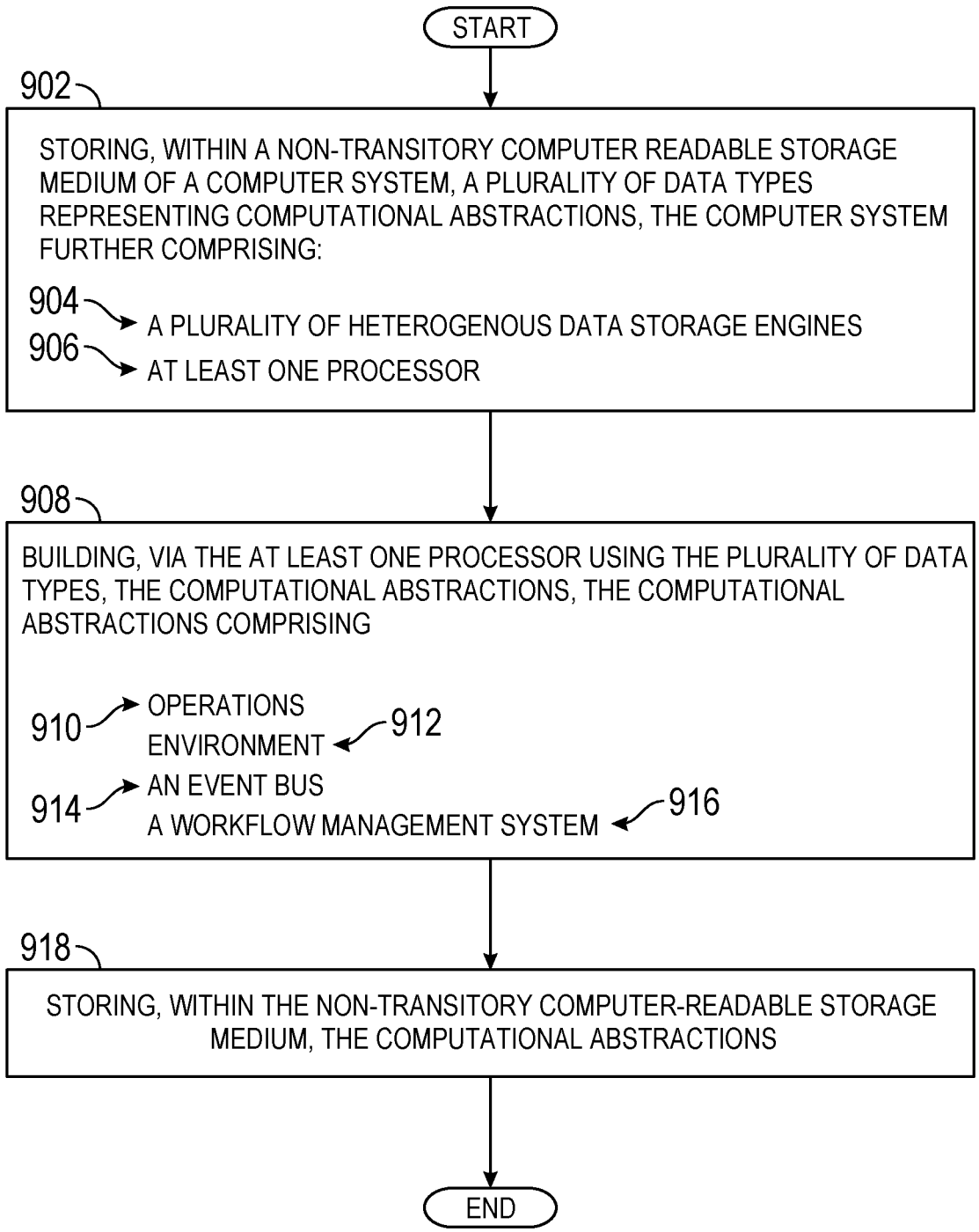
FIG. 9 illustrates an example method embodiment.

FIG. 9 illustrates an example method embodiment. As illustrated, a system configured as disclosed herein can store, within a non-transitory computer readable storage medium of a computer system, a plurality of data types representing computational abstractions, the computer system further comprising (902): a plurality of heterogenous data storage engines (904); and at least one processor (906). The system can then build, via the at least one processor using the plurality of data types, the computational abstractions, the computational abstractions comprising (908): operations (910), environment (912), an event bus (914), and a workflow management system (916). The system can then store, within the non-transitory computer-readable storage medium, the computational abstractions (918).

In some configurations, the plurality of heterogenous data storage engines can include at least file, at least one database, and at least one API.

In some configurations, the plurality of data types are programming language agnostic.

In some configurations, the computational abstractions can further include: a datastore, service, a state plan, a secret datastore, and/or plugins.

In some configurations, the illustrated method can further include executing, via the at least one processor, an operation using the operations computational abstraction, the environment, and the workflow management system.

In some configurations, the computational abstractions stored within the non-transitory computer-readable storage medium can be removed.

In some configurations, the plurality of data types are reloaded by the computer system at runtime.

Figure 10:
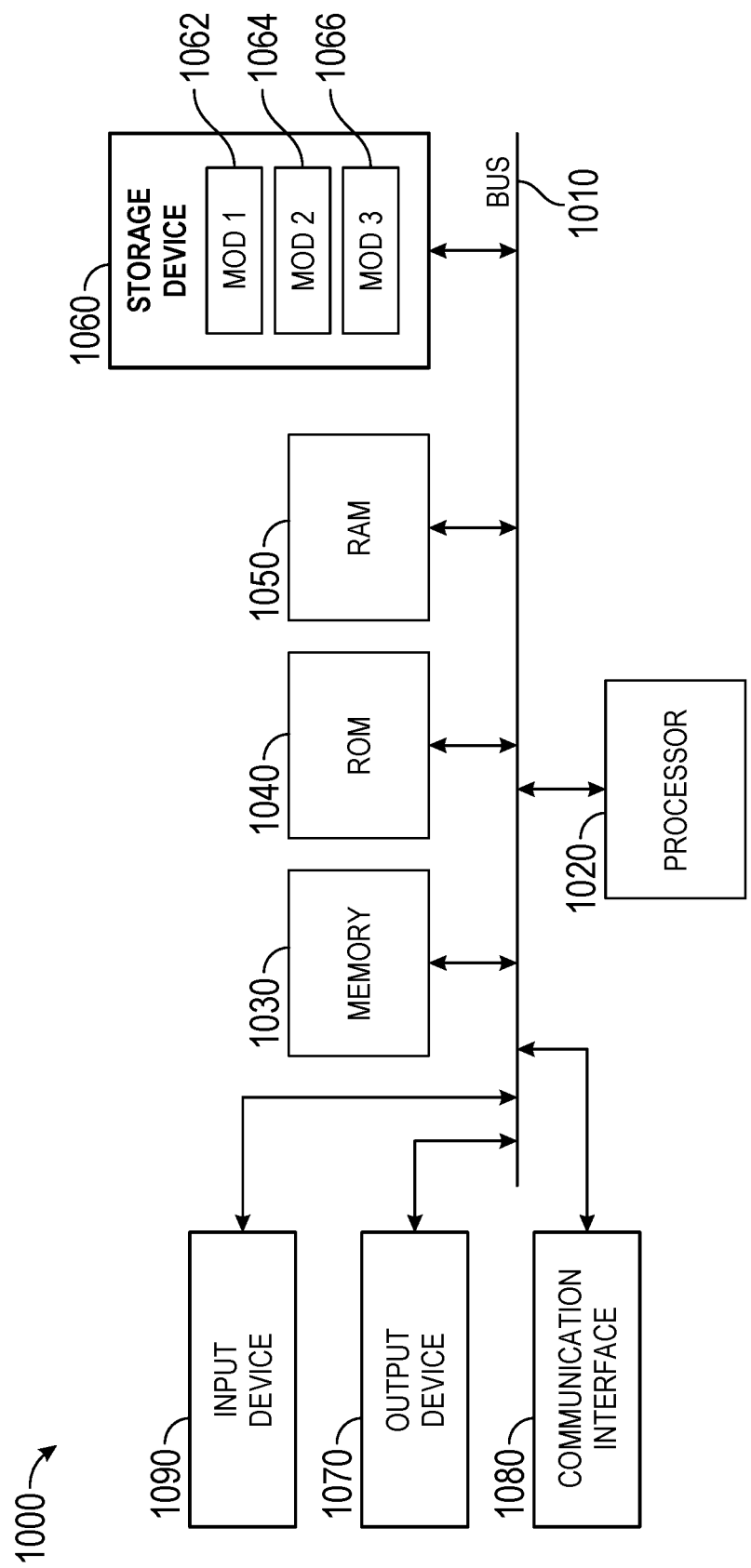
FIG. 10 illustrates an example computer system.

With reference to FIG. 10, an exemplary system includes a general-purpose computing device 1000, including a processing unit (CPU or processor) 1020 and a system bus 1010 that couples various system components including the system memory 1030 such as read-only memory (ROM) 1040 and random-access memory (RAM) 1050 to the processor 1020. The system 1000 can include a cache of high-speed memory connected directly with, in close proximity to, or integrated as part of the processor 1020. The system 1000 copies data from the memory 1030 and/or the storage device 1060 to the cache for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general-purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 further includes storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 is connected to the system bus 1010 by a drive interface. The drives and the associated computer-readable storage media provide nonvolatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, bus 1010, display 1070, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 1000 is a small, handheld computing device, a desktop computer, or a computer server.

Although the exemplary embodiment described herein employs the hard disk 1060, other types of computer-readable media which can store data that are accessible by a computer, such as magnetic cassettes, flash memory cards, digital versatile disks, cartridges, random access memories (RAMs) 1050, and read-only memory (ROM) 1040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art. In some instances, multimodal systems enable a user to provide multiple types of input to communicate with the computing device 1000. The communications interface 1080 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

The invention claimed is:
1. A method comprising:
  storing, within a non-transitory computer readable storage medium of a computer system, a plurality of data types representing at least one computational abstraction, the computer system further comprising:
    a plurality of heterogenous data storage engines for managing CRUD (create, read, update, delete) operations within a datastore; and
    at least one processor;
  building, via the at least one processor using the plurality of data types, the at least one computational abstraction; and storing, within the non-transitory computer-readable storage medium, the at least one computational abstraction such that the at least one computational abstraction can execute on any data storage engine within the plurality of heterogenous data storage engines.

2. The method of claim 1, the plurality of heterogenous data storage engines comprising at least one data storage engine for managing files, at least one data storage engine for managing databases, and at least one data storage engine for managing APIs.

3. The method of claim 1, wherein the plurality of data types are programming language agnostic.

4. The method of claim 1, wherein the at least one computational abstraction further comprises at least one of:
   operations;
   an environment;
   an event bus;
   a workflow management system;
   the datastore;
   service;
   a state plan;
   a secret datastore; and
   plugins.

5. The method of claim 4, further comprising:
   executing, via the at least one processor, an operation using the at least one computational abstraction.

6. The method of claim 1, wherein the at least one computational abstraction stored within the non-transitory computer-readable storage medium can be removed.

7. The method of claim 1, wherein the plurality of data types are reloaded by the computer system at runtime.

8. A system comprising:
   a plurality of heterogenous data storage engines for managing CRUD (create, read, update, delete) operations within a datastore;
   at least one processor; and
   a non-transitory computer-readable storage medium having instructions stored which, when executed by the at least one processor, cause the at least one processor to perform operations comprising:
      storing, within the non-transitory computer readable storage medium, a plurality of data types representing at least one computational abstraction;
      building, using the plurality of data types, the at least one computational abstraction; and
      storing, within the non-transitory computer-readable storage medium, the at least one computational abstraction such that the at least one computational abstraction can execute on any data storage engine within the plurality of heterogenous data storage engines.

9. The system of claim 8, the plurality of heterogenous data storage engines comprising at least one data storage engine for managing files, at least one data storage engine for managing databases, and at least one data storage engine for managing APIs.

10. The system of claim 8, wherein the plurality of data types are programming language agnostic.

11. The system of claim 8, wherein the at least one computational abstraction further comprises at least one of:
   operations;
   an environment;
   an event bus;
   a workflow management system;
   the datastore;
   service;
   a state plan;
   a secret datastore; and
   plugins.

12. The system of claim 8, the non-transitory computer-readable storage medium having additional instructions stored which, when executed by the at least one processor, cause the at least one processor to perform operations comprising:
   executing an operation using the at least one computational abstraction.

13. The system of claim 8, wherein the at least one computational abstraction stored within the non-transitory computer-readable storage medium can be removed.

14. The system of claim 8, wherein the plurality of data types are reloaded by the system at runtime.

15. A non-transitory computer-readable storage medium of a computer system having instructions stored which, when executed by at least one processor, cause the at least one processor to perform operations comprising:
   storing, within the non-transitory computer readable storage medium of a computer system, a plurality of data types representing at least one computational abstraction, the computer system further comprising a plurality of heterogenous data storage engines for managing CRUD (create, read, update, delete) operations within a datastore;
   building, using the plurality of data types, the at least one computational abstractions; and
   storing, within the non-transitory computer-readable storage medium, the at least one computational abstraction such that the at least one computational abstraction can execute on any data storage engine within the plurality of heterogenous data storage engines.

16. The non-transitory computer-readable storage medium of claim 15, the plurality of heterogenous data storage engines comprising at least one data storage engine for managing files, at least one data storage engine for managing databases, and at least one data storage engine for managing APIs.

17. The non-transitory computer-readable storage medium of claim 15, wherein the plurality of data types are programming language agnostic.

18. The non-transitory computer-readable storage medium of claim 15, wherein the at least one computational abstractions comprises at least one of:
   operations;
   an environment;
   an event bus;
   a workflow management system;
   the datastore;
   service;
   a state plan;
   a secret datastore; and
   plugins.

19. The non-transitory computer-readable storage medium of claim 15, having additional instructions stored which, when executed by the at least one processor, cause the at least one processor to perform operations comprising:
   executing an operation using the at least one computational abstraction.

20. The non-transitory computer-readable storage medium of claim 15, wherein at least one computational abstraction stored within the non-transitory computer-readable storage medium can be removed.

* * * * *